UNITED STATES PATENT OFFICE.

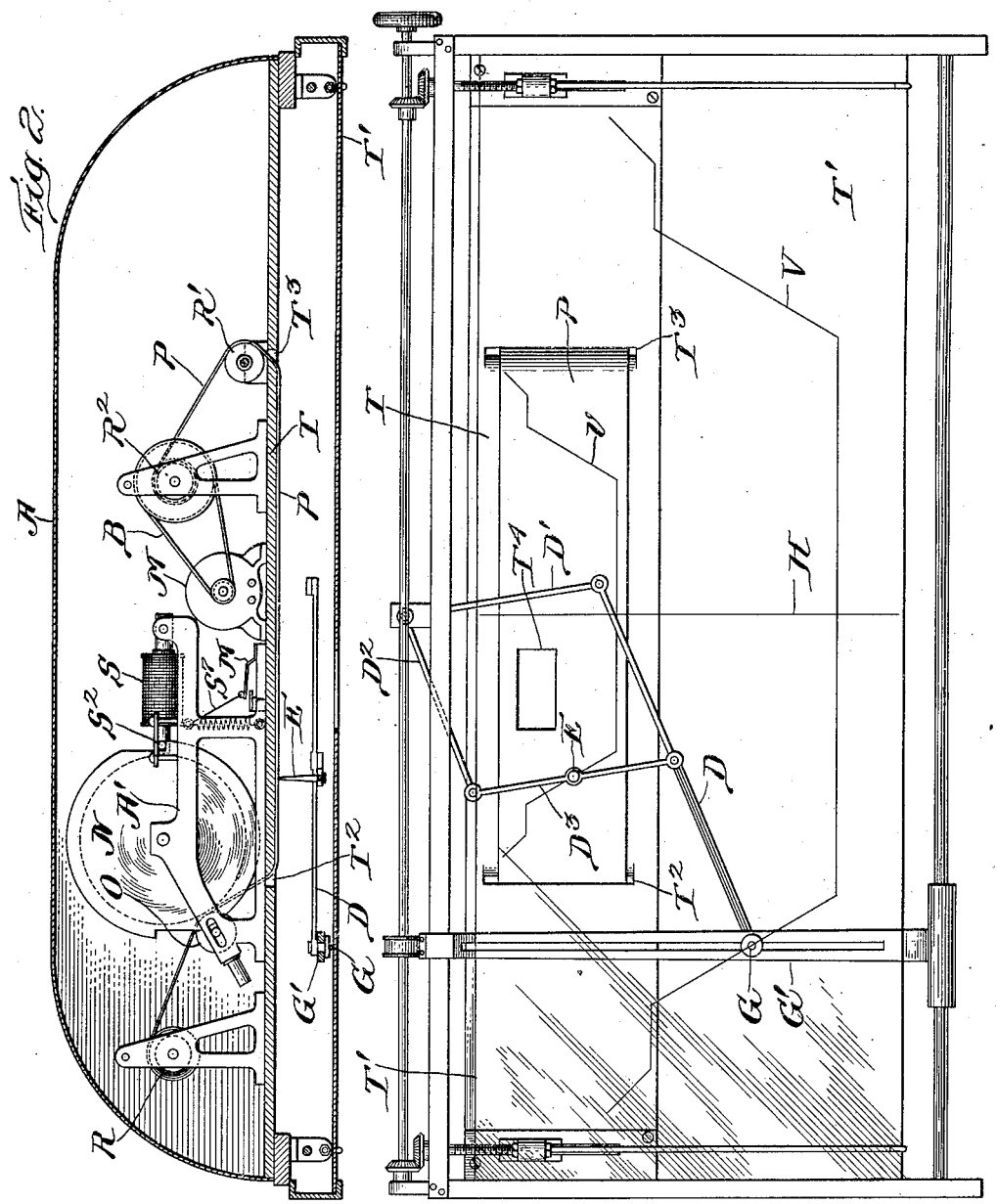

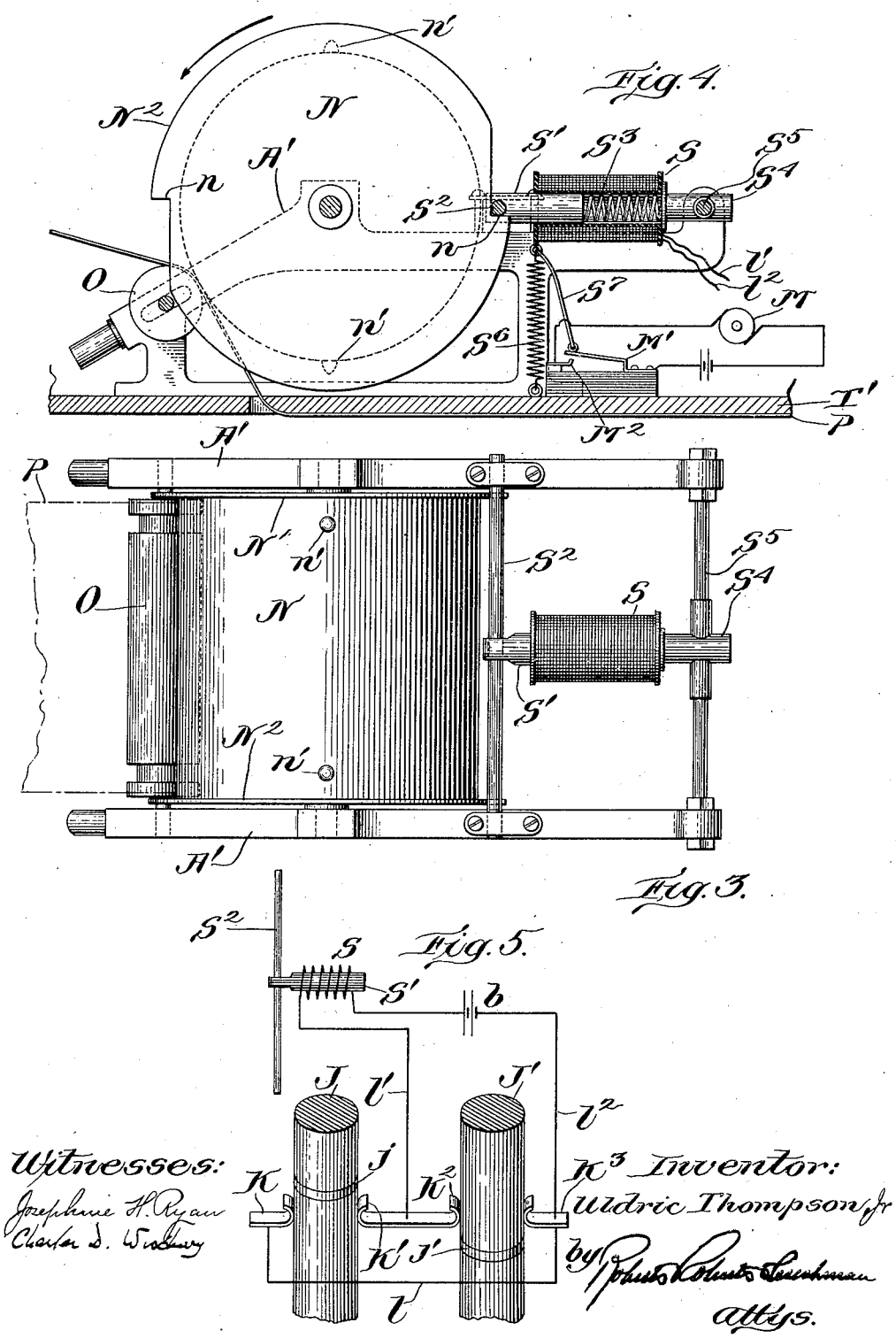

ULDRIC THOMPSON, JR., OF ITHACA, NEW YORK.

RECORDING APPARATUS FOR DREDGES AND THE LIKE.

1,097,378.  Specification of Letters Patent.  Patented May 19, 1914.

Application filed November 29, 1912. Serial No. 733,929.

*To all whom it may concern:*

Be it known that I, ULDRIC THOMPSON, Jr., a citizen of the United States, and resident of Ithaca, in the county of Tompkins and State of New York, have invented new and useful Improvements in Recording Apparatus for Dredges and the like, of which the following is a specification.

My invention relates to apparatus for excavating or dredging tunnels or canals and consists in improvements particularly applicable to the apparatus described in Letters Patent of the United States No. 890,470, granted June 9, 1908, to Harrison S. Taft and myself.

The object of my present invention and improvements is to provide a diagrammatic record of the operations of the excavating or dredging instrument, making diagrams which constitute the record contemporaneously with the progressive operations of the dredging instrument. Among the uses to which such a diagrammatic record are applicable may be mentioned the inspection and checking of the work done and of the speed and efficiency with which the work is conducted.

The best illustration which I can offer of the construction and operation of my recording devices is in their application to the dredger indicating or directing apparatus described in the aforesaid patent and I therefore refer to the specifications of that patent for such description of a dredger, its excavating apparatus, the means for periodically advancing the dredge progressively, the apparatus whereby the control over the dredging apparatus is made and accuracy and facility of operation secured. As the specifications of the said patent may be referred to for a description of the details of such apparatus a general statement of its character and mode of operation will suffice herein.

Generally speaking the invention described in the said patent provides a table in full view of the man who controls the movements of the dredger, a tracer and connections therewith which cause the tracer to execute movements over the table which, on a reduced scale correspond faithfully with the movements of the dredging instrument over the section of material being removed thereby. On this table a sectional outline of the cut being excavated is drawn to such a scale that when the excavating instrument reaches either a lateral or lower proper limit of operation in the cut, the tracer will at the same time reach the sectional outline drawn on the table. By such means described in full in the said patent, the tracer and the table on which the section of the cut is drawn serves as an automatic director to guide the man who is in control of the movements of the dredger and the excavating instrument. While the apparatus described in the said patent provides means for controlling and guiding the man who is operating the dredger apparatus, it provides no means for recording the movements made by the dredging instrument and therefore for checking the work after it has been done. The inventions and improvements hereinbelow described provide means for making a permanent record of the dredging operations, and the successive stages thereof.

In the drawings hereto annexed which illustrate a mode of carrying my inventions into effect, Figure 1 is a view in plan of a table of a dredge directing apparatus of the character generally shown in said Patent No. 890,470; Fig. 2 is a view in elevation of the interior of the casing to which the dredge director table is attached; Fig. 3 is an elevation in detail on a large scale of the diagram strip measuring drum and its controlling devices; Fig. 4 is a side view of the same, showing the electrical connections diagrammatically; and Fig 5 is a diagram illustrating the electrical connections which control the starting of the automatic strip feeding mechanism.

Referring to Fig. 1, the dredge director table is designated by T'; which is preferably of glass so as to render visible while at the same time to protect the tracer, tracer mechanism and other parts which operate beneath the plate or table T'. Beneath this table T' and parallel thereto, the automatic strip supporting plate T is located and the transparent table T' is provided with an aperture as at $T^4$ for purposes presently to be described. The tracer G is mounted in the tracer guide G' and both the tracer and the said guide are connected and controlled in the manner described in the said Patent No. 890,470, so as automatically to give directions to the man in control of the dredging operation by means of the visible positional relation between the tracer G and the sectional outline V which is marked upon the table T'. The table T', strip supporting plate T, and the containing case for the strip feeding mechanism presently to be described, are secured together as a unit, so as to be adjustable as a unit in relation to the tracing devices. Such adjustment provides for such external variations as rise or fall of the level of water in which the dredge floats, or other variations which alter the vertical position of the dredging instrument, other than those which are operative to actuate the tracer. In order to provide means for making a permanent record of the movements of the tracer G, and consequently also of the movements of the dredging instrument, my improved dredge director contains devices to present diagram blanks successively in position in the operating field of a marker, which reproduces perfectly on a still smaller scale the movements of the tracer G which, as above described, reproduces the movements of the excavating instrument. Means for reducing from the movement of the tracer are recommended, because a permanent diagram as large as the tracer diagram V would be unnecessarily cumbersome, while on the other hand a tracer diagram employed to guide the man in control of the dredging operation needs to be of ample size in order to perform its function adequately.

In Fig. 1, the instruments for making permanent records are shown in part. The plate T secured to the frame of the dredge-directing apparatus beneath and parallel to the table T' is perforated with slots at $T^2$ and $T^3$, through which the paper strip P passes. The movement of this paper strip serves to present diagram blanks successively in the operating field of the marker E, which comprises a marking point such as a pencil lead, this marker being secured to the pantographic reducing frame, of which the members are D, D', $D^2$ and $D^3$. The strip P has imprinted upon it at intervals the sectional outline $v$ which reproduces on a smaller scale the sectional outline V. Each diagram blank, is in the specific instance shown, a stated length of the paper strip P, and may bear upon its surface suitable data with blanks to be filled by the man who is controlling the dredging operation. For this last named purpose the table T' may be perforated as at $T^4$, to provide an aperture through which access may be had to the paper P. It will now be obvious that when a diagram blank, such as seen in Fig. 1, is brought into registering position, so that the marker E always occupies the same position, relatively speaking, with respect to the outline $v$ as the tracer G does with respect to the outline V, the operation of the dredging apparatus will, while it imparts movement to the tracer G, also cause this movement to be reproduced by the marker E, which, however, unlike the tracer G, makes a permanent record of the movements of the dredging instrument upon the diagram $v$. For the purposes of illustration the entire tracer table T' is shown as transparent. If desired, however, that portion of the tracer table T' which lies over the part of the paper strip P which is between the slots $T^2$ and $T^3$, may be made opaque, so that except for the portion visible through the aperture $T^4$ the diagram blank is concealed from the view of the man in control of the dredging operation, who will therefore be obliged to be guided solely by the tracer G.

Various and sundry means for presenting diagram blanks successively in the operating field of the marker may doubtless be contrived, but I believe that automatic means entirely out of the control of the man in charge of the dredging apparatus are preferable to any means wholly or partly subject to his manipulation.

As fully set forth in the specification of Letters Patent No. 890,470, the dredge and its machinery progresses intermittently, finishing one sectional cut before advancing to take out the next section of material. While excavating one section the dredge scow is anchored by and pivoted on one of a pair of spuds located usually at the stern of the scow. When a sectional cut is completed and the dredge is to be advanced to begin the next cut, the dredging scow is moved forward, the hitherto elevated spud lowered and fixed in the bottom of the canal, trench or other excavation, and the spud previously employed as an anchor and pivot is raised. This operation is repeated, the spuds moving forward step by step to advance the dredging scow each time a fresh section of material is to be excavated. As these spud movements are incidental to the intermittent progress of the scow, they also correspond to those stages in the operation of the entire apparatus when one diagram blank, such as $v$, Fig. 1, has received its record and should be superseded by another blank. I therefore take advantage of this situation to employ the spuds as part of automatic means for initiating the movement of the paper strip P. The electric connections from the spuds to the diagram blank advancing mechanism are shown diagrammatically in Fig. 5, in which J and J' are the spuds which carry respectively metallic contact rings $j$, $j'$, which are so placed as to make contact momentarily with contact springs $k$, $k'$ and $k^2$, $k^3$, as the spud is either raised or lowered. These contact springs are connected in circuit by wires $l$, $l'$, and $l^2$ and a battery $b$ furnishes electric energy to the circuit, which contains the solenoid S. This solenoid is associated with the diagram strip feeding mechanism and will presently be described more in detail. It will now be seen that whenever the dredging apparatus has finished cutting out one section of material, one of the spuds, say J, is anchored in the canal bottom. The dredge is moved forward a short distance with the spud J still anchored. Then the spud J' is dropped, closing the circuit from $k^2$ to $k^3$ through the ring $j'$, permitting the battery $b$ to energize the solenoid S. Then the spud J is raised, closing the circuit momentarily from $k$ to $k'$ through the ring $j$, causing the solenoid to be again energized. Obviously one or both of the spuds may be equipped with circuit closing devices to initiate the movement of paper strip feeding devices through the agency of the solenoid S.

Referring now to Fig. 2, which shows a mechanism for presenting successive diagram blanks in the operating field of the marker; M is a small electric motor, of which the shaft is belted to a winding roll $R^2$. This winding roll receives the paper strip P, which is drawn from a supply roll R between the measuring drum N and a presser roll O through the slot $T^2$ in the plate T across the said plate through the slot $T^3$ around the guide roll R' to the winding roll $R^2$. The solenoid S connected in the circuit shown in diagram in Fig. 5, acts to release the measuring drum N from the restraint of the stop $S^2$, and then to close the circuit in which the motor M is included. The motor starts, actuating the winding roll $R^2$ through the belt B, drawing the paper strip from the supply roll R until the measuring drum N has made a half revolution, when notches in the periphery of the heads of the drum reëngage the stop $S^2$ and cause the circuit of the battery M to be opened. The details of the paper feeding mechanism are shown, partly in diagram in Figs. 3 and 4. The measuring drum N has upper and lower heads N' and $N^2$ in which notches $n, n$, are formed diametrically opposite each other. The solenoid S is provided with an armature S' and is pivoted at $S^4$ upon the rod $S^5$. A spring $S^3$ shown in Fig. 4, urges the armature S' and stop-rod $S^2$ constantly toward the drum N. A spring $S^6$ constantly tends to swing the solenoid S upon its pivot $S^4$ and a cord or other connection $S^7$ leads from the solenoid S to a member of the spring switch at M', $M^2$. This switch controls the opening and closing of the circuit in which the motor M is included. The solenoid S is connected with the circuit controllers shown in Fig. 5 by wires $l'$, $l^2$. When a spud, as J', is dropped, the solenoid is energized, and the stop-rod $S^2$ carried by the armature S' drawn against the stress of the spring $S^3$ out of the notches $n$; spring $S^6$ asserts itself and swings the solenoid S on its pivot $S^4$, slackening the connection $S^7$ and allowing spring switch M', $M^2$ to close, thus starting the motor M to wind the paper strip P on the winding roll $R^2$ (Fig. 2). The paper strip has to pass between the measuring drum N and the presser roll O, so that the movement of the paper strip P causes the measuring drum to rotate in the direction indicated by the arrow in Fig. 4. Meanwhile, the solenoid circuit which was only momentarily energized has become inactive, and the spring $S^3$ presses the stop-rod $S^2$ against the flanges N', $N^2$ of the measuring drum N, so that when the opposite notches $n$ reach the stop $S^2$ the measuring drum is arrested, the solenoid swung on its pivot against the spring $S^6$, tightening the connection $S^7$ to open the contact M', $M^2$, thus stopping the paper feed. If need be, the paper feed may be made to actuate the measuring drum N more positively by means of studs $n'$ thereon, which enter suitable perforations near the edges of a paper strip.

With the apparatus herein specifically shown the measuring drum will be of such size as to advance the paper strip one half the distance necessary for the substitution of one diagram blank for another, so that the circuit closures determined by the movements of both spuds J and J' will be required to energize the solenoid S twice, and thus to give the paper roll its advance in two stages. A paper roll such as P is first printed with a series of outlines $v$ which constitute the principal portion of the diagram blanks, and the first blank being set in the machine so as to register correctly with the marker E and the section outline V the movement of the dredging apparatus will thereafter automatically replace one diagram blank for another at the proper time, and cause a permanent record to be made of every movement of the dredging instrumet. The man in charge of the operation need only fill in the blanks presented beneath the aperture $T^4$, and as this may be done in most cases by a rubber stamp his attention need be diverted but little from the more important duties of controlling the operation of the dredging apparatus with the aid of the dredge-directing devices described hereinabove and in the patent aforesaid, No. 890,470.

What I claim and desire to secure by Letters Patent is:—

1. In a dredging apparatus of the character described, the combination of a tracer and tracer mechanism operated in conformity with movements of the excavating instrument, of automatic means, controlled by progressive movement of the dredging scow to present diagram blanks successively in the operating field of a marker, and the marker, said marker operatively associated with the tracer mechanism to record diagrammatically the movements of the excavating instrument.

2. In a dredging apparatus of the character described, the combination of a tracer and tracer mechanism operated in conformity with movements of the excavating instrument, of automatic means, controlled by progressive movement of the dredging scow, to present diagram blanks successively in the operating field of a marker, motion-reducing devices connected with the tracer mechanism, a marker mounted on said motion-reducing devices, to record diagrammatically the movements of the excavating instrument.

3. In a dredging apparatus of the character described, the combination with a tracer and tracer mechanism operated in conformity with movements of the excavating instrument, of automatic means, electrically controlled by the intermittent manipulation of the spuds employed to anchor the dredging scow in a progressive series of positions, to present diagram blanks successively in the operating field of a marker, and the marker; said marker operatively associated with the tracer mechanism to record diagrammatically the movements of the excavating instrument.

4. In a dredging apparatus of the character described, the combination with a tracer and tracer mechanism operated in conformity with movements of the excavating instrument, of automatic means electrically controlled by the intermittent manipulation of the spuds employed to anchor the dredging scow in a progressive series of positions, to present diagram-blanks successively in the operating field of a marker, motion-reducing devices connected with the tracer mechanism, a marker mounted on said motion-reducing devices to record diagrammatically the movements of the excavating instrument.

5. In a dredging apparatus of the character described, the combination with a tracer and tracer mechanism operated in conformity with movements of the excavating instrument, of automatic means controlled by progressive movement of the dredging scow to present successive portions of a diagram-strip in the operating field of a marker, and the marker; said marker operatively associated with the tracer mechanism to record diagrammatically the movements of the excavating instrument.

6. In a dredging apparatus of the character described, the combination with a tracer and tracer mechanism operated in conformity with movements of the excavating instrument, of automatic means controlled by progressive movement of the dredging scow to present successive portions of a diagram-strip in the operating field of a marker, motion-reducing devices connected with the tracer mechanism, a marker mounted on said motion-reducing devices, to record diagrammatically the movements of the excavating instrument.

7. In a dredging apparatus of the character described, the combination with a tracer and tracer mechanism operated in conformity with movements of the excavating instrument, of automatic means electrically controlled by the intermittent manipulation of the spuds employed to anchor the dredging scow in a progressive series of positions to present successive portions of a diagram strip in the operating field of a marker, and the marker; said marker operatively associated with the tracer mechanism to record diagrammatically the movements of the excavating instrument.

8. In a dredging apparatus of the character described, the combination with a tracer and tracer mechanism operated in conformity with movements of the excavating instrument, of automatic means electrically controlled by the intermittent manipulation of the spuds employed to anchor the dredging scow in a progressive series of positions to present successive portions of a diagram-strip in the operating field of a marker, motion-reducing devices connected with the tracer mechanism, a marker mounted on said motion reducing devices to record diagrammatically the movements of the excavating instrument.

Signed by me at New York, N. Y. this 11th day of November, 1912.

ULDRIC THOMPSON, Jr.

Witnesses:
 FRITZ ZIEGLER, Jr.,
 W. WECKMANN.

---

Copies of this patent may be obtained for five cents each, by addressing the "Commissioner of Patents, Washington, D. C."